United States Patent [19]

Suzuki et al.

[11] Patent Number: 4,956,717
[45] Date of Patent: Sep. 11, 1990

[54] METHOD OF AND APPARATUS FOR CONTROLLER DUPLEX PAGE PRINTER

[75] Inventors: Kenji Suzuki, Hadano; Kikuo Hatazawa, Atsugi; Shinichi Kishi, Mito, all of Japan

[73] Assignees: Hitachi, Ltd.; Hitachi Koki Co., Ltd., both of Tokyo, Japan

[21] Appl. No.: 284,635

[22] Filed: Dec. 15, 1988

[30] Foreign Application Priority Data

Dec. 18, 1987 [JP] Japan ............................ 62-321020

[51] Int. Cl.⁵ .................. H04N 1/23; G01D 15/28; G03B 27/52
[52] U.S. Cl. ............................... 358/296; 355/319; 355/24; 346/136
[58] Field of Search ............ 355/319, 23, 24, 26, 355/25; 358/296, 300, 302; 346/108, 150, 153.1, 160, 107 R, 134

[56] References Cited

U.S. PATENT DOCUMENTS 4,116,558 9/1978 Adamek et al. .
4,213,694 7/1980 Kuseski ........................ 358/300

Primary Examiner—Bruce A. Reynolds
Assistant Examiner—Scott A. Rogers
Attorney, Agent, or Firm—Pennie & Edmonds

[57] ABSTRACT

A method of and an apparatus for controlling a duplex page printer, which performs a printing operation in such a manner that printing data is converted into dot patterns, and dot patterns for a plurality of pages are stored in a full-dot memory and then read out from the memory to be printed on the pages, are disclosed. According to the method and apparatus, in order to storing dot patterns in the memory while performing a printing operation, when printing data for both surface of the first sheet of paper is converted into dot patterns and the dot patterns are stored in the memory, a printing operation is stored, and printing data for the following sheets of paper is converted into dot patterns at the same time as the printing operation is performed. Further, each time two storage areas of the memory, each of which corresponds to one page, become empty, dot patterns for one of the remaining sheets of paper are stored in two empty storage areas.

7 Claims, 3 Drawing Sheets

FIG. 2
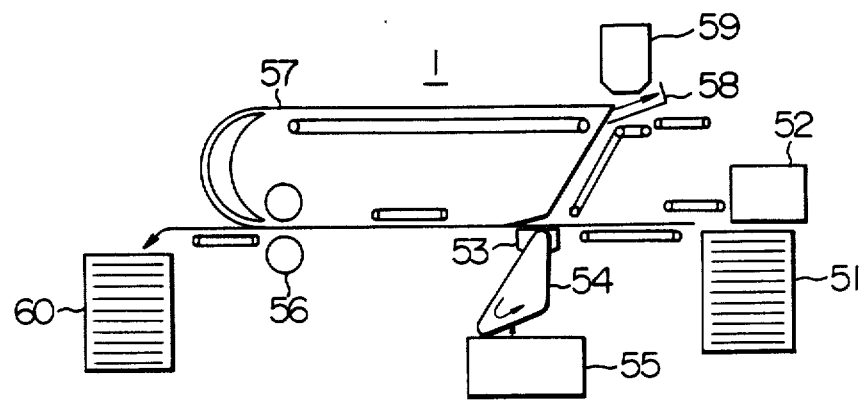
FIG. 3
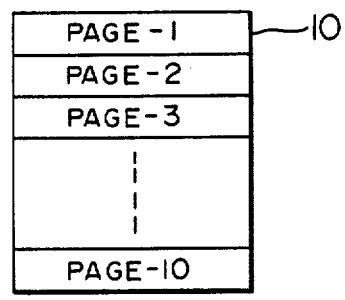
FIG. 4
| | PAGE | START ADDRESS | END ADDRESS |
|---|---|---|---|
| | 1 | | |
| 16—PAGE POINTER | 2 | | |
| 17—HEAD POINTER | 3 | | |
| | ⋮ | ⋮ | ⋮ |
| 18—END POINTER | 10 | | |

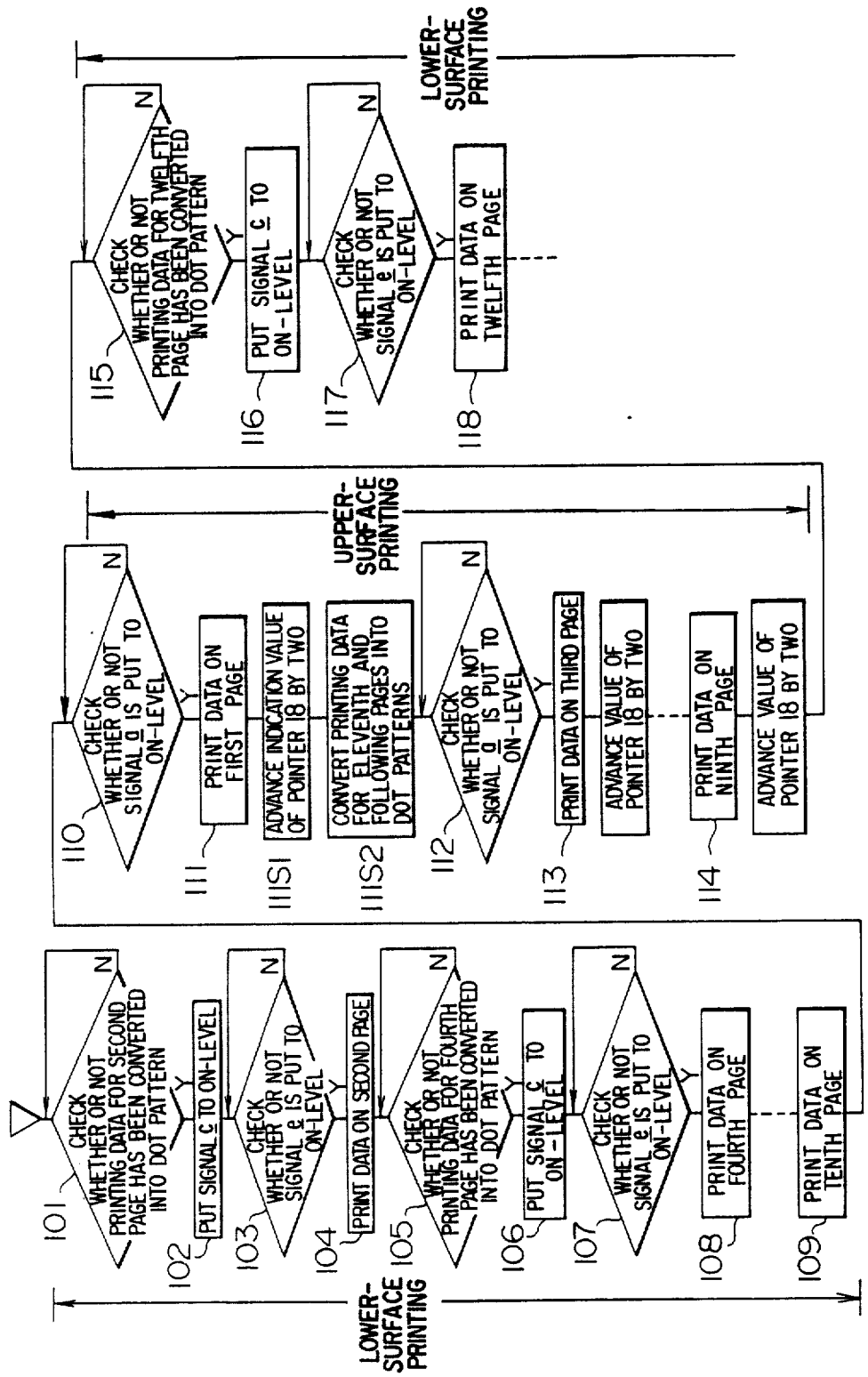

METHOD OF AND APPARATUS FOR CONTROLLER DUPLEX PAGE PRINTER

BACKGROUND OF THE INVENTION

The present invention relates to a method of controlling a duplex page printer operating in such a manner that a printing operation is first performed for the first surface of each of a plurality of sheets of paper which are successively supplied from a paper feed mechanism to a printing part, the sheets of paper are then sent to a paper transfer path having a paper turning-over mechanism, to be sent back to the printing part, a printing operation is performed for the second surface of each sheet of paper, and then the sheets of paper are sent to the outside (e.g. U.S. Pat. No. 4,116,558 may be referred to for such a printer).

A conventional printing controller for a duplex page printer capable of transferring a plurality of sheets of paper (for example, five sheets of paper) at the same time, is provided with a full-dot memory capable of storing printing data for ten pages in the form of dot patterns. In more detail, printing data including form information and printing letter data is sent out from the channel on the host side, and is converted into dot patterns, to be stored in the full-dot memory. When the printing data for ten pages is converted into dot patterns and the dot patterns are stored in the memory, the duplex page printer is activated, and a paper feeding operation and a printing operation are started.

In such a control method, however, a time interval between a time the printer controller begins to receive the printing data and a time the printer begins to perform a printing operation, becomes long. Specifically, in a case where it takes a lot of time to convert the printing data for at least one page of a plurality of sheets of paper into a dot pattern, the start of the printing operation will be greatly delayed, even if printing data for the remaining pages can be converted into dot patterns in a short time. Further, printing data for the following pages cannot be converted into dot patterns till the full-dot memory becomes empty. Accordingly, the conversion of the printing data for the following pages into dot patterns is delayed by an amount corresponding to the delay in start of printing operation, and thus a time necessary for performing a printing operation for a predetermined number of sheets of paper will be increased.

SUMMARY OF THE INVENTION

It is an object of the present invention to provide a method of and an apparatus for controlling a duplex page printer so that a time necessary for performing a printing operation for a predetermined number of sheets of paper is shortened.

According to one aspect of the present invention, there is provided a method of controlling a duplex page printer operating in such a manner that a printing operation is first performed for the first surface of each of a plurality of sheets of paper which are successively supplied from a paper feed mechanism to a printing part, the sheets of paper are then sent to a paper transfer path having a paper turning-over mechanism, to be sent back to the printing part, a printing operation is performed for the second surface of each sheet of paper, and then the sheets of paper are sent to the outside, which method comprising the steps of: starting a printing operation when printing data for the first and second surfaces of the first sheet of paper has been converted into dot patterns; and converting printing data for the following sheets of paper into dot patterns at the same time as the printing operation is performed.

Further, according to another aspect of the present invention, there is provided a printer controller for controlling a duplex page printer operating in such a manner that a printing operation is first performd for the first surface of each of a plurality of sheets of paper which are successively supplied from a paper feed mechanism to a printing part, the sheets of paper are then sent to a paper transfer path having a paper turning-over mechanism, to be sent back to the printing part, a printing operation is performed for the second surface of each sheet of paper, and then the sheets of paper are sent to the outside, which controller comprising: editing means supplied with printing data for converting the printing data into dot pattern data; full-dot memory means for storing therein dot pattern data for a plurality of pages, in order of address; adapter means provided for the printer, to take out the dot pattern data for each page, from the memory means; and control means for controlling the operation of each of the editing means, the memory means and the adapter means so that when printing data for both surfaces of at least the first sheet of paper is converted into dot patterns and the dot patterns are stored in the memory means, the operation of the adapter means is started, and moreover the conversion of printing data for the following sheets of paper into dot patterns and the storage of the dot patterns in the memory means ar carried out.

As mentioned above, according to the present invention, there is provided a printer controller having a full-dot memory capable of storing dot patterns for a plurality of pages, for controlling a duplex page printer in such a manner that when printing data for the first and second surface of the first sheet of paper has been converted into dot patterns, the printing operation of the printer is stored and the following printing data is converted into dot patterns, and that each time a storage area of a full-dot memory corresponding to at least two pages becomes empty, the following printing data is converted into dot patterns to be stored in the memory. For example, for a duplex page printer capable of transferring five sheets of paper at the same time, when printing data for the first sheet of paper is converted into dot patterns, the printing operation of the printer is started, and printing data for the following sheets of paper is converted into dot patterns. Hence, a time interval between a time the printer controller begins to receive printing data and a time the printer starts the printing operation, is shortened in a great degree. As mentioned above, the printing operation and the conversion of printing data into dot patterns are simultaneously carried out. Accordingly, even when it takes a lot of time to convert printing data for a page into a dot pattern, the long conversion time can be compensated by a short time necessary to convert printing data for each of the remaining pages into dot pattern, and hence it is unnecessary to interrupt the printing operation. Thus, a printing operation for a predetermined number of sheets of paper can be performed in a time for shorter than that required in the conventional method.

BRIEF DESCRIPTION OF THE DRAWINGS

FIG. 2 is a schematic diagram showing the outline of a duplex page printer.

FIG. 3 is a schematic diagram for explaining the full-dot memory of FIG. 1.

FIG. 4 is a schematic diagram for explaining the management table of FIG. 1.

FIG. 5 is a flow chart showing the operation of the embodiment of FIG. 1.

DESCRIPTION OF THE PREFERRED EMBODIMENT

Figure 1:
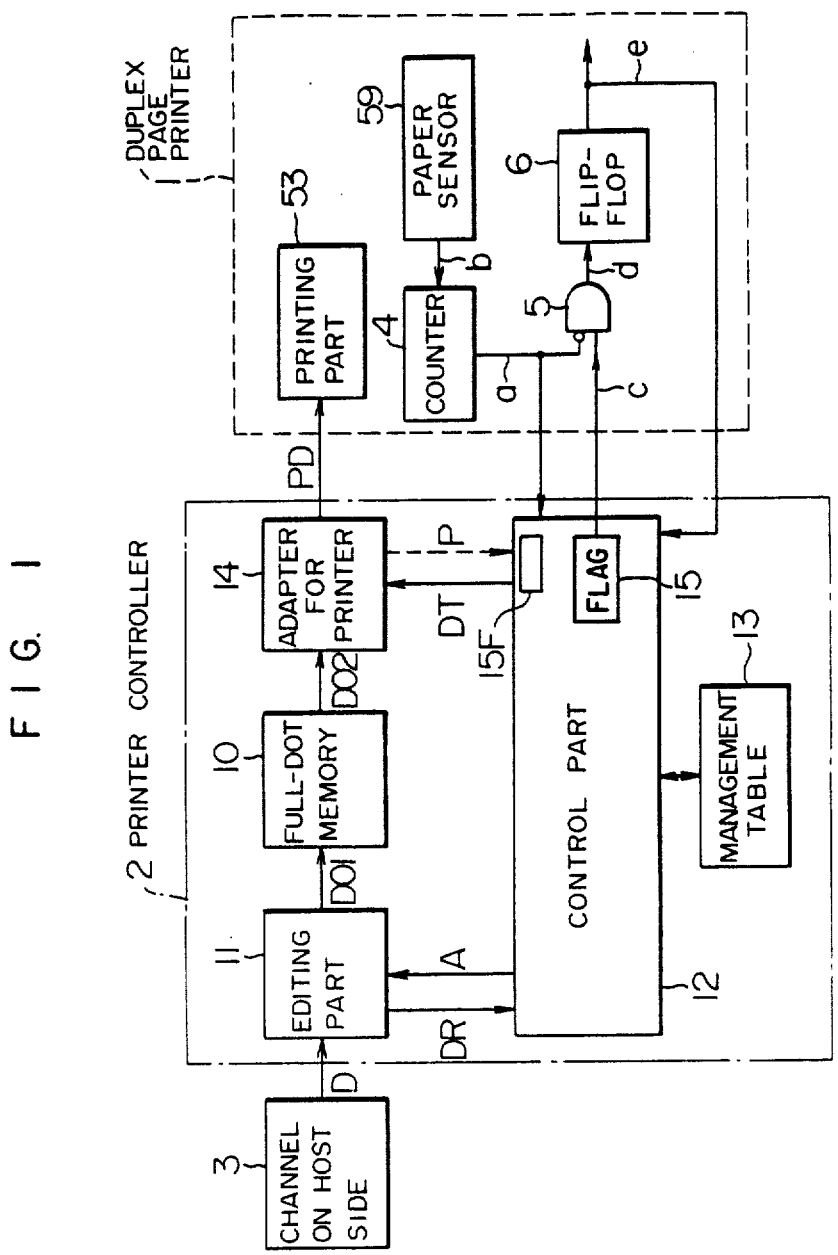
FIG. 1 is a block diagram showing an embodiment of a printer controller for controlling a duplex page printer in accordance with the present invention.

FIG. 1 is a block diagram for explaining an embodiment of a printer controller for controlling a duplex page printer in accordance with the present invention. In FIG. 1, reference numeral 1 designates a duplex page printer, 2 a printer controller (that is, present embodiment), and 3 a channel on the host side. An editing part 11, a full-dot memory 10 and an adapter 14 which are included in the printer controller 2, have the same functions as those of the laser printer controller H-6275-C10 manufactured by Hitachi Ltd. FIG. 2 is a schematic diagram showing the outline of the duplex page printer 1.

The construction of the duplex page printer 1 will first be explained, with reference to FIG. 2. In FIG. 2, reference numeral 51 designates a hopper for storing a plurality of sheets of paper, on which data is to be printed, 52 a paper feed mechanism for taking out the sheets of paper from the hopper 51 one by one to send each sheet of paper to a printing part 53, 54 a photo-sensitive belt, and 55 an illumination part for illuminating the photo-sensitive belt 54 in accordance with printing data. The printing part 53 transfers a image which is recorded in the photosensitive belt 54, to each sheet of paper. Further, in FIG. 2, reference numeral 56 designates a pair of heating rollers for fixing an image which is transferred to each sheet of paper, 57 a paper transfer path for sending a sheet of paper, on the lower surface of which data has been printed, back to the receiving part 53, to print data on the upper surface of the sheet of paper, and 60 a stacker for storing a sheet of paper, on the upper and lower surfaces of which data has been printed. The paper transfer path 57 is provided with a paper turning-over mechanism 58 for turning each sheet of paper over and a paper sensor 59 for detecting the arrival of each sheet of paper.

The operation of the duplex page printer 1 is as follows. That is, a sheet of paper is sent to the printing part 53 with the aid of the paper feed mechanism 52 so that data is printed on the lower surface of the sheet of paper, and then the sheet of paper is sent to the paper transfer path 57. Five sheets of paper are successively sent to the printing part 53, to print data on the lower surface of each sheet of paper. Each sheet of paper whose lower surface has printed data, is turned over by the paper turning-over mechanism 58, and then sent back to the printing part 53 to print data on the upper surface of the paper. The paper, on the upper and lower surface of which data has been printed, is then sent to the stacker 60.

Now, the present embodiment will be explained with reference to FIG. 1. Referring to FIG. 1, a counter 4 included in the duplex page printer 1 puts a signal a to an ON-level when the tip of the paper which is transferred along the paper transfer path 57 reaches the printing part 53. In more detail, the counter 4 begins to count up clock pulses at a time a signal b is put to an ON-level in response to the detection of the tip of the paper by the paper sensor 59, and the counter 4 puts the signal a to the ON-level at a time the number of counted pulses reaches a predetermined value. The signal a is a signal for enabling a printing operation for the upper surface of paper, as will be explained later. A gate 5 included in the printer 1 controls a signal c from the printer controller 2 (namely, present embodiment) by the signal a. The signal c is generated on the basis of a flag 15 which is set each time printing data for the upper and lower surfaces of a sheet of paper is converted into dot patterns. In order to inhibit the signal c from passing through the gate 5 when the signal a for enabling the printing operation for the upper surface of paper is generated, the signal a is inverted in polarity and then applied to the gate 5. A flip-flop circuit 6 is set by the output signal d of the gate 5, and the output signal e of the flip-flop circuit 6 is applied to the driver circuit (not shown) of the paper feed mechanism 52 to operate the driver circuit, and is also applied to a control part 12 included in the printer controller 2 to reset the flag 15. Accordingly, each time printing data for the upper and lower surfaces of one sheet of paper is converted into dot patterns, one or more sheets of paper are sent out from the paper feed mechanism 52. Other control circuits included in the printer 1 are omitted from FIG. 1 for the sake of brevity, and other control lines connected between the printer 1 and the printer controller 2 are also omitted.

Now, the printer controller 2 (that is, present embodiment) will be explained below. Referring to FIG. 1, the full-dot memory 10 can store dot pattern data corresponding to the upper and lower surfaces of five sheets of paper (that is, ten pages), and the editing part 11 converts a printing data signal D into dot patterns to send a first dot signal DO1 indicative of the dot patterns to the full-dot memory 10. The printing data signal D is supplied from the channel 3 on the host side, and includes form information, change-of-page information, printing letter data and others. The editing part 11 includes a buffer memory for temporarily storing printing data before the printing data is converted into dot patterns. The control part 12 controls write and read operations for the full-dot memory 10. In a case where information on the change of pages is included in the printing data signal D, a data reception signal DR indicative of the change-of-page information is sent from the editing part 11 to the control part 12, and a dot pattern producing signal A including write address information is sent from the control part 12 to the editing part 11 in response to the data reception signal DR. Further, the control part 12 utilizes the management table 13 to manage dot patterns which correspond to pages and are stored in the full-dot memory 10. The adapter 14 which is provided for the printer 1, receives a second dot signal DO2 read out from the full-dot memory 10, and the second dot signal DO2 is sent, as printing data PD, to the printing part 53 of the duplex page printer 1. The editing part 11 stores the pattern data (that is, first dot signal DO1) in the memory 10 at an address specified by the dot-pattern producing signal A. Further, a dot transfer signal DT including read address information for controlling the data transfer between the memory 10 and the adapter 14 is applied to the adapter 14 independently of a write operation for the memory 10. Thus, the adapter 14 can read out pattern data (that is, second dot signal DO2) from that address of the memory 10 which is specified by the data transfer signal DT.

FIG. 3 is a schematic diagram for explaining the full-dot memory 10. As shown in FIG. 3, the full-dot memory 10 has ten storage areas each corresponding to one page. The storage areas have the same size. Write and read operations are performed for each of the storage areas. In a case where a printing operation is performed for a plurality of sheets of paper, printing data for the upper and lower surface of the first sheet of paper is first converted into dot patterns, which are stored in two storage areas, that is, the page-1 and page-2 of FIG. 3, dot patterns corresponding to printing data for the upper and lower surfaces of the second sheet of paper are stored in the page-3 and page-4 of FIG. 3, and dot patterns corresponding to printing data for the upper and lower surfaces of the fifth sheet of paper are stored in the page-9 and page-10 of FIG. 3. When the printing data stored in the page-1 and page-2 has been printed and thus the page-1 and page-2 become empty, printing data for the upper and lower surfaces of the sixth sheet of paper is converted into dot patterns, which are stored in the page-1 and page-2. Further, when the page-3 and page-4 become empty, printing data for the upper and lower surfaces of the seventh sheet of paper is converted into dot patterns, which are stored in the page-3 and page-4.

FIG. 4 is a schematic diagram for explaining the management table 13. The read and write operations for the management table 13 are controlled by the control part 12, and the start and end addresses in each storage area (i.e. page) of the memory 10 are written in the management table 13. In FIG. 4, reference numeral 16 designates a page pointer for indicating a storage area which is being read out, 17 a head pointer for indicating a first one of empty storage areas and 18 an end pointer for indicating a last one of empty storage areas. The term "empty storage area" means that one of ten storage area of the memory 10 which does not yet store a dot pattern corresponding to printing data, or can store a new dot pattern since a dot pattern stored in the storage area has been printed. In the present embodiment, printing data for a plurality of pages is converted into dot patterns in order of page number. When the printing data for the tenth page is converted into a dot pattern and the dot pattern is stored in the page-10, the printing data for the following pages is converted into dot patterns, and the dot patterns thus produced are stored in the page-1 and the following storage areas which are made empty. That empty storage area of the memory 10 which is first generated in the above process, is called "first empty storage area", and an empty storage area which is last generated, is called "last empty storage area". The control part 12 detects a storage area which is to be subjected to a write or read operation, on the basis of these pointers, and reads out the start and end addresses in this storage area from the management table. On the basis of the above operations, the control part 12 can control the write and read operations for the memory 10 and the conversion of printing data for the following sheets of paper into dot patterns. Further, the pointers 16, 17 and 18 are kept unchanged even when a printing operation or the like is temporarily stopped, to be used when such an operation is resumed.

Now, explanation will be made of the relation among the conversion of printing data into dot patterns, the full-dot memory 10 and the management table 10.

The printing operation for the lower surfaces of a plurality of sheets of paper (that is, even pages) is first performed. When a printing operation for an odd page has been performed, the indication value of end pointer 18 is advanced by the amount of two storage areas. For example, when the printing operation for the first page has been performed, the end pointer 18 indicates the page-2 of the management table 13. When printing data for one page is converted into a dot pattern and the dot pattern is stored in the full-dot memory 10, the indication values of head pointer 17 is advanced by the amount of one storage area. For example, when printing data for seven pages is converted into dot patterns, the page-8 to page-10 of the memory 10 are empty, and thus the head pointer 17 is set to indicate the page-8. The page pointer 16 for indicating a storage area which is being read out, is advanced by the amount of two storage areas when data stored in a storage area is printed. Thus, the pointer 16 is advanced to indicate in the order of page-2→page-4→page-6→page-8→page-10→page-1→page-3 . . . page-9→page-2 → . . . . Each of the pointers 16, 17 and 18 is advanced to cyclically indicate from the last storage area of table 13 to the first storage area thereof, that is, is advanced by the wrap-around method.

When the head pointer 17 is advanced to reach the end pointer 18, the full-dot memory 10 has no empty storage area, and hence the conversion of printing data into a dot pattern is stopped. At this time, there is no fear of a printing operation stopping, since a large amount of printing data has been stored in the full-dot memory 10.

Next, explanation will be made of the linkage operation among the duplex page printer 1, the printer controller 2, and the channel 3 on the host side. When the printing data singnal D from the channel 3 is applied to the buffer memory of the editing part 11, the editing part 11 sends the data reception signal DR to the control part 12, so that the control part 12 checks whether or not dot patterns corresponding to the printing data signal D can be stored in the memory 10, on the basis of the contents of the management table 13. In a case where no data is stored in the memory, that is, the memory 10 is put in an initial state, the control part 12 sends the dot-pattern producing signal A to the editing part 11 to start the conversion of the printing data signal into dot patterns. Thus, the first dot signal DO1 is sent from the editing part 11 to the memory 10, and dot patterns are successively stored in the storage areas of the memory 10. At the same time as the dot pattern data is stored in the memory 10, not only the start and end addresses in each storage area of the memory 10 but also the head pointer 17 is written in the management table 13 by the control part 12. When the dot pattern data DO1 corresponding to one page is stored in the memory 10, the head pointer 17 is advanced or updated by one storage area. In other words, the head pointer 17 is advanced by one storage area, in response to the data reception signal DR included in the printing data signal D for indicating the change of pages. In a case where the data reception signal DR is not included in the printing data signal D, the head pointer 17 is advanced by one storage area after it has been confirmed that the dot pattern data DO1 corresponding to one page has been written in the memory 10. When it is confirmed from the head pointer 17 of the management table 13 that dot pattern data has been written in the page-2 of the memory 10, namely, the head pointer 17 is advanced by one, the control part 12 sets the flag 15 to put the signal c to an ON-level, thereby operating the paper feed mechanism 52. Thereafter, the control part 12 sends the data transfer signal DT to the adapter 14 in accordance with the start and end addresses in the page-2 of the management table 13, to read out the dot pattern data DO2 from the page-2 of the memory 10. The dot pattern data DO2 thus obtained is applied, as the printing data PD, to the printing part 53, and the printing data PD is printed by a printing operation. Independently of the transfer of data to the printing part 53 and the printing operation, the formation of dot pattern by the editing part 11 and the storage of dot pattern in the memory 10 are continued till a dot pattern is stored in the page-10 of the memory 10. Each time a dot pattern is stored in an even-numbered storage area (namely, page-4, page-6, page-8, or page-10) of the memory 10, the printing operation is performed to print data on the lower surface of a sheet of paper, and the page pointer 16 is advanced by two storage areas. When it is confirmed from the position of the page pointer 16 that the data on the page-10 has been printed, the control part 12 resets the flag 15, and sets a upper-surface printing flag 15F to indicate that a printing operation for the upper surface of each sheet of paper is started. Further, the control part 12 supplies data transfer signals DT corresponding to the page-1, page-3, and page-9 successively to the adapter 14 in response to the signal a from the counter 4. Thus, the dot pattern signal DO2 read out from odd-numbered storage areas of the memory 10 is sent, as printing data signal DP, to the printing part 53, to use the printing data signal PD in a printing operation. The control part 12 advances the page pointer 16 by two storage areas, in response to the data transfer signal DT. Alternatively, the adapter 14 may be constructed so that a printing signal P is sent from the adapter 14 to the control part 12 each time data in one storage area of the memory 10 has been transferred to the adapter 14. In this case, the control part 12 advances the pointer 16 by two storage areas, in response to the printing signal P. The end pointer 18 is advanced by two storage areas, in response to the data transfer signal DT, the signal a, or the advancement of the page pointer 16. Further, the control part 12 checks whether or not the difference between the indication values of the head pointer 17 and the end pointer 18 is greater than two storage areas of the memory 10 (that is, data has been printed on both surfaces of a sheet of paper). Even in a case where the memory 10 is not put in the initial state but dot pattern data is stored in a portion of the memory 10, and the write operation is resumed after the interruption thereof, when it is detected that the difference between the indication values of the head pointer 17 and the end point 18 is greater than two storage areas, the dot-pattern producing signal A is applied to the editing part 11 by reference to the contents of the management table 13, to store the dot pattern data DO1 for the following two pages in the memory 10. When it is detected that the pointer 18 is set at the page-10 and that the dot signal DO2 corresponding to the end address in the page-9 has been transferred by the adapter 14, the flag 15F is reset after a predetermined time has elapsed, to show that a lower-surface printing cycle is started.

Next, the above printing control operation will be explained in more detail, with reference to the flow chart of FIG. 5.

Printing data for a plurality of sheets of paper is converted by the editing part 11 into dot pattern, which are successively stored in the full-dot memory 10. The printing data for first five sheet of paper (that is, ten pages) is continuously converted into dot patterns, independently of a printing operation. Thereafter, the printing data for the following sheet of paper is converted into dot patterns by the interrupt method each time two adjacent storage areas of the memory 10 are made empty. That is, when the control part 12 detected that the difference between the indication values of the head pointer 17 and the end pointer 18 corresponds to two storage areas of the memory 10, the control part 12 supplies the dot-pattern producing signal A to the editing part 11.

The control part 12 monitors the conversion of printing data into dot patterns, and checks whether or not printing data for the lower surface of the first sheet of paper (that is, the second page) has been converted into a dot pattern (step 101). When it is confirmed that the printing data for the second page has been converted into the dot pattern, the control part 12 sets the flag 15, to put the signal c to an ON-level, thereby requiring the duplex page printer 1 to feed paper (step 102). At this time, the signal a is kept at an OFF-level, and hence the signal d is put to an ON-level. Thus, the flip-flop circuit 6 is set, and the paper feed mechanism 52 is operated to send paper to the printing part 53.

After the signal c has been put to the ON-level, the control part 12 checks whether or not the signal e is put to an ON-level (step 103). When the signal e is put to the ON-level, the dot pattern stored in the page-2 of the memory 10 is transferred to the duplex page printer 1 through the adapter 14, to be printed on the lower surface of the first sheet of paper (step 104). Then, the flag 15 is reset to put the signal c to an OFF-level. Thus, the flip-flop circuit 6 is reset, and the signal e is put to an OFF-level.

Next, the control part 12 checks whether or not printing data for the fourth page (that is, the lower surface of the second sheet of paper) has been converted into a dot pattern (step 105). When it is confirmed that the printing data for the fourth page has been converted into the dot pattern, the signal c is put to the ON-level (step 106). When, it is checked whether or not the signal e is put to the ON-level (step 107). In this case, the signal e is immediately put to the ON-level. Hence, the dot pattern stored in the page-4 of the memory 10 is transferred to the duplex page printer 1, to be printed on the lower surface of the second sheet of paper (step 108).

Each of the dot pattern stored in the page-6 and page-8 of the memory 10 is transferred to the duplex page printer 1 in the same manner as mentioned above. Further, the dot pattern stored in the page-10 of the memory 10 is transferred to the duplex page printer 1, to be printed on the lower surface of the fifth sheet of paper (step 109). Then, the control part 12 changes lower-surface printing over to upper-surface printing, and checks whether or not the signal a is put to an ON-level (step 110). When the first sheet of paper which is transferred along the paper transfer path 57 and turned over by the turning-over mechanism 58, is returned to the printing part 53, the signal a from the counter 4 is put to the ON-level. Then, the control part 12 operates the adapter 14, and a dot pattern stored in the page-1 of the memory 10 is transferred to the duplex page printer 1, to be printed on the upper surface of the first sheet of paper (step 111).

Next, the control part 12 checks whether or not the signal a is put to the ON-level (step 112). When the signal a is put to the ON-level, the dot pattern stored in the page-3 of the memory 10 is transferred to the duplex page printer 1, to be printed on the upper surface of the second sheet of paper (step 113). Each of the first and second sheets of paper is sent to the stacker 60 after the upper-surface printing.

Each of dot patterns stored in the page-5 and page-7 of the memory 10 is printed in the same manner as above. Next, the dot pattern stored in the page-9 of the memory 10 is printed on the upper surface of the fifth sheet of paper (step 114). Then, the control part 12 changes the upper-surface printing over to the lower-surface printing. That is, the control part 12 checks whether or not printing data for the upper and lower surfaces of the sixth sheet of paper is coverted into dot patterns (step 115). When it is confirmed that the above printing data is converted into dot patterns, the signal c is put to the ON-level (step 116). Then, it is checked whether or not the signal e is put to the ON-level (step 117). When it is confirmed that the signal e is put to the ON-level, the dot pattern stored in the page-2 of the memory 10 is transferred to the duplex page printer 1, to be printed on the lower surface of the sixth sheet of paper, that is, the twelfth page (step 118). Then, dot patterns are successively printed on the following sheets of paper in the above-mentioned manner. It is to be noted that the printing operation is performed for the upper and lower surfaces of each sheet of paper in the order of the second page, the fourth page, the sixth page, the eighth page, the tenth page, the first page, the third page, the fifth page, the seventh page, the ninth page, the twelfth page, the fourteenth page, and so on.

As mentioned above, when printing dots for the upper and lower surfaces of the first sheet of paper is converted into dot patterns, a printing operation is started, and printing data for the following sheets of paper is converted into dot patterns at the same time as the printing operation is performed. Accordingly, the time interval between a time the printer controller begins to receive printing data and a time the printer begins to perform a printing operation, is shortened in a great degree. Further, the printing operation and the conversion of printing data into dot patterns are simultaneously carried out, as described above. Accordingly, even when it takes a lot of time to convert printing data for a page into a dot pattern, the long conversion time can be compensated by a short time necessary to convert printing data for each of the remaining pages into a dot pattern, and thus it will be unnecessary to interrupt the printing operation. Accordingly, a printing operation for a predetermined number of sheets of paper can be performed in a time for shorter than that required in the conventional method.

In the present embodiment, in order to stack a plurality of sheets of paper in the stacker 60 so that the upper surface (namely, front surface) of each sheet of paper is disposed on the bottom side of the stacker 60, printing data is first printed on the lower surface (namely, back surface) of each sheet of paper, and then printed on the front surface thereof. Alternately, the printing part 53, photo-sensitive belt 54 and illumination part 55 of the duplex page printer 1 may be disposed on the upper surface side of a sheet of paper supplied from the paper feed mechanism 52, to perform a printing operation in such a manner that printing data is first printed on the front surface of each sheet of paper and then printed on the back surface thereof.

In the present embodiment, the conversion of printing data into a dot pattern, the storage of the dot pattern in the memory 10, and the printing of the dot pattern on the lower or upper surface of a sheet of paper are controlled by the control part 12. Alternatively, to control parts may be provided to control two kinds of processing (that is, the conversion of printing data into a dot pattern and the storage of the dot pattern in the memory 10) by a first one of two control parts, and to control the printing of the dot pattern on a page, by the second control part.

As is evident from the above explanation, according to the present invention, a time interval between a time the printer controller begins to receive printing data and a time the printer begins to perform a printing operation, and a time necessary to perform a printing operation for a predetermined number of sheets of paper, can be made for shorter than those required in the conventional method.

What is claimed is:

1. A method of controlling a duplex page printer operating in such a manner that a printing operation is first performed for the first surface of each of a plurality of sheets of paper which are successively supplied from a paper feed mechanism to a printing part, the sheets of paper are then sent to a paper transfer path having a paper turning-over mechanism, to be sent back to the printing part, a printing operation is performed for the second surface of each sheet of paper, and then the sheets of paper are sent to the outside, the method comprising the steps of:

preparing a dot pattern memory for storing dot pattern data to be printed on each surface of the sheets of paper;

converting input printing data into dot pattern data sequentially for each surface of said sheets;

storing the converted dot pattern data in respective page areas of a dot pattern memory which are allotted to the first and second surfaces of said sheets;

starting a printing operation when the printing operation for the first and second surfaces of the first sheet of paper has been converted into dot pattern data and stored in said memory; and starting to convert input printing data for the following sheet of paper into dot pattern data at the same time as the said printing operation is started.

2. A method according to claim 1, further comprising the steps of:

writing, on a memory management table, the start and end addresses of page areas for storing said dot pattern data detecting the completion of transfer of a page area data to said printing part, wherein said page area data is the dot pattern data for said second surface of said first sheet of paper; and detecting, by pointer means, a head page area and a last page area, which respectively indicate page area within said dot pattern memory available for writing and storage of new said dot pattern data, wherein said pointer means is responsive to dot pattern data input to said dot pattern memory and said detection of transfer completion, wherein when the printing operation for the first and second surfaces of the first sheet of paper has been completed, printing data for the remaining sheets of paper is converted into dot patterns.

3. A method to claim 2, wherein each time the printing operation for the first and second surfaces of each one sheet of paper has been completed, printing data for the remaining sheets of paper is converted into dot patterns.

4. A method according to claim 2, wherein when at least two storage areas of the full-dot memory, each of which corresponds to one page, become empty, the following dot pattern data is stored in the storage areas.

5. A method according to claim 2, wherein dot patterns stored in even-numbered page areas of the full-dot memory are successively read out, to be printed on the lower surfaces of a plurality of sheets of paper, and then dot patterns stored in odd-numbered page areas of the full-dot memory are successively read out, to be printed on the upper surfaces of the sheets of paper, and wherein each time it is detected that dot patterns stored in a pair of odd-number and even-numbered page areas of the full-dot memory have been printed on both surfaces of a sheet of paper, dot patterns corresponding to printing data for one of the remaining sheets of paper are stored in the odd-number and even-numbered page areas.

6. A printer controller for controlling a duplex page printer operating in such a manner that a printing operation is first performed for the first surface of each of a plurality of sheets of paper which are successively supplied from a paper feed mechanism to a printing part, the sheets of paper are then sent to a paper transfer path having a paper turning-over mechanism, to be sent back to the printing part, a printing operation is performed for the second surface of each sheet of paper, and then the sheets of paper are sent to the outside, the printer controller comprising:

editing means supplied with printing data for converting the printing data into dot pattern data;

full-dot memory means for storing therein dot pattern data for a plurality of pages, in order of address;

an adapter means provided for the printer to take out the dot pattern data for each page, from the memory means; and control means controlling the editing means, the memory means, and the adapter means in order for enabling the editing means to convert printing data for both surface pages of at least the first sheet of paper into dot pattern data, enabling the memory means to store the resulting dot pattern data in at least first areas thereof, and thereafter simultaneously start the first printing operation by the adapter means and the printing part and convert printing data for pages of a following sheet into dot pattern data to store the converted data in corresponding areas of the memory means.

7. A printer controller according to claim 6, wherein the control means is provided with a management table which has a head pointer for indicating the first one of empty storage areas of the memory means each corresponding to one page and an end pointer for indicating the last one of the empty storage areas of the memory means, and wherein the printer controller further comprises means for advancing the head pointer by one storage area each time dot pattern data for one of the first and second surfaces of a sheet of paper is stored in the memory means, means for advancing the end pointer by two storage areas each time dot pattern data for the second surface of a sheet of paper is read out from the memory mans, and means for storing dot pattern data in empty storage areas of the memory means, on detecting that the difference between the indication values of the head pointer and the end pointer corresponds to at least two storage areas.

* * * * *